United States Patent [19]
Makimura et al.

[11] 3,870,688
[45] Mar. 11, 1975

[54] TITANIUM TARTRATE CATALYZED POLYESTERIFICATION

[75] Inventors: Osamu Makimura; Teruo Goto, both of Ohtsu, Japan

[73] Assignee: Toyoboseki Kabushiki Kaisha, Osaka-fu, Japan

[22] Filed: Apr. 9, 1974

[21] Appl. No.: 459,304

Related U.S. Application Data

[63] Continuation-in-part of Ser. No. 251,979, May 10, 1972, abandoned.

[30] Foreign Application Priority Data

May 12, 1971 Japan.............................. 46-31838
Dec. 23, 1971 Japan.............................. 46-2512

[52] U.S. Cl............................................... 260/75 R
[51] Int. Cl........................................... C08g 17/015
[58] Field of Search .................................. 260/75 R

[56] References Cited
UNITED STATES PATENTS

| | | | |
|---|---|---|---|
| 3,321,444 | 5/1967 | Hoyer et al. | 260/47 |
| 3,444,139 | 5/1969 | Jeurissen et al. | 260/75 |
| 3,644,291 | 2/1972 | Price et al. | 260/75 |

Primary Examiner—Melvin Goldstein
Attorney, Agent, or Firm—Lane, Aitken, Dunner & Ziems

[57] ABSTRACT

In the production of a linear aromatic polyester, an uncolored polyester with a suitable whiteness can be obtained in a short reaction time by using a titanium tartrate compound as a catalyst for polycondensation of an ester of an aromatic dicarboxylic acid and a glycol and/or of a low molecular weight polymer of the ester.

9 Claims, No Drawings

TITANIUM TARTRATE CATALYZED POLYESTERIFICATION

CROSS-REFERENCE TO RELATED APPLICATION

This application is a continuation-in-part of our co-pending application, U.S. Pat. Ser. No. 251,979, filed May 10, 1972 and now abandoned and entitled "Process for Producing Polyesters" and claims the priority of Japanese applications 31838/1971, filed May 12, 1971 and 2512/1972, filed Dec. 23, 1971.

BACKGROUND OF THE INVENTION

This invention relates to a method for the preparation of linear aromatic polyesters, and more particularly to a method for preparing a linear aromatic polyester using a novel catalyst.

In conventional processes, a long period of time is required to directly esterify terephthalic acid and ethylene glycol due to the slow reaction rate. These conventional processes produce polyesters that contain a large number of ether bonds, which bonds tend to lower the melting point and heat stability of the polyester. The resultant polyester also possesses an undesirable off-white color. In order to accelerate the esterification and to prevent the formation of by-products, various reaction methods have been proposed in the art. Typical of the prior art methods is a method wherein the esterification is carried out at a high temperature and high pressure by removing the water of reaction from the system. Another prior art method for esterification involves the use of an acid having a large particle size. However, the prior art methods have had only limited success in overcoming the problems outlined above.

It is well known that a polyester can be prepared by using a antimony compound such as antimony trioxide, or a titanium oxalate compound such as potassium titanium oxalate as a polycondensation catalyst. However, the use of an antimony compound as a polycondensation catalyst has a disadvantage in that the resultant polyester has a dark or greyish color. When a titanium oxalate compound is employed as the catalyst, the reaction rate is remarkably increased, but the polyester so obtained has an undesirable yellow color. Additionally, aqueous solutions containing titanium oxalate compounds are unstable and susceptible to photolysis, which results in a reduction in transparency due to the precipitation of titanium hydroxide in the solution and in a color change to yellow to brown. A titanium oxalate compound has another disadvantage in that it is strongly corrosive and will attack the walls of a metallic reactor. The use of a titanic acid-orthoester as a catalyst also encounters difficulties because the compound is subject to hydrolysis and is difficult to handle in a small quantity.

SUMMARY OF THE INVENTION

It has now been discovered that the above-stated deficiencies of the prior art methods for the preparation of polyesters by polycondensation can be completely overcome by using a titanium tartrate compound as the catalyst. Thus the present invention provides an improved method for preparing a linear aromatic polyester by polycondensation of at least one ester of an aromatic dicarboxylic acid and a glycol and/or its low molecular-weight polymer in the presence of a titanium tartrate compound. It has also been discovered that a titanium tartrate compound is particularly useful as a catalyst for the direct esterification of an aromatic dicarboxylic acid and a glycol and subsequent polycondensation of the ester. In another embodiment a bis($\beta$-hydroxyalkyl)ester, produced by the interesterification of an alkyl dicarboxylate and a glycol, are polycondensed in the presence of a titanium tartrate compound.

Accordingly, it is an object of the present invention to provide a method for preparing a polyester having a high degree of whiteness and free from the disadvantages of the prior art processes.

It is another object of the present invention to provide a novel catalyst for the preparation of linear aromatic polyesters.

Yet another object of the present invention is to provide a method for preparing a polyester with a high degree of polymerization in a short reaction time.

A still further object of the present invention is to provide a method, using a novel catalyst, for the direct esterification reaction of terephthalic acid and ethylene glycol and subsequent polycondensation.

These and other features and objects of the present invention will be apparent to those skilled in the art from a reading of the detailed description to follow.

DESCRIPTION OF THE PREFERRED EMBODIMENTS

The method of the present invention is directed to the preparation of linear aromatic polyesters. In accordance with the present invention, a titanium tartrate compound is used as a catalyst. The term "titanium tartrate compound", as used herein, signifies titanium salts of tartaric acid and mixed salts of tartaric acid containing titanium and another metal or ammonium moiety. These compounds are represented by the following formula:

$$TiO.(C_4H_4O_6 M_e 1/n)_2 . mH_2O$$

wherein $n$ is the Valence of a metal $M_e$

The titanium tartrate compounds that may be used as the catalyst of the present invention include titanium tartrate (III), titanium tartrate (IV), ammonium titanium tartrate, sodium titanium tartrate and potassium titanium tartrate.

These useful titanium tartrate compounds may be prepared by dissolving glutinous titanic acid in water and reacting same with potassium tartrate. While crystals of a titanium tartrate compound are obtained from the resultant aqueous raction solution and purified by recrystallization. This procedure is more fully described in the German publication "Gmelins Handbuch der Anorg. Chem. 8 Auflege, 41 Titan (1951)" at pp. Ti 373, 392, 404 and 410, the teachings of which are herein incorporated by reference. The titanium tartrate catalysts may also be prepared by a double decomposition reaction of alkali titanium tartrates with the corresponding metallic chlorides.

The amount of titanium tartrate compound to be employed as a catalyst is not critical; the amount to be used may be within a range of 0.0001–5% by weight of the polyester product, and preferably 0.001–0.1% by weight. The above-mentioned catalysts may be used alone or in combination, and many also be used in combination with other known catalysts such as zinc acetate, manganese acetate, antimony trioxide, etc. The titanium tartrate catalyst introduced into the reaction system may be in the form of a solid, an aqueous solution, a solution having ethylene glycol as the solvent, or in the form of a slurry. The catalyst of the present invention may be added to the reaction system at any point during the time starting with the introduction of raw materials until the initiation of the reaction or later, depending on the nature of the reactants. For example, where the starting material is a glycol ester of aromatic carboxylic acid and/or its low molecular-weight polymer, the catalyst may be added thereto at any time, but preferably before the initial stage of polycondensation. On the other hand, when terephthalic acid and ethylene glycol are the reactants, the catalyst should be introduced into the reaction system during the interval between the introduction of the starting materials and the initial stage of the direct esterification reaction. In the latter case where the ester is subsequently undergoing polycondensation, it is unnecessary to newly add another catalyst for the polycondensation since the catalyst of this invention also serves as a polycondensation catalyst.

The present invention is particularly directed to the production of linear aromatic (alkyl) polyesters containing at least 80 mole % alkyleneterephthalate units. Thus, the preferred esters subjected to polycondensation in accordance with the present invention are alkyleneterephthalates or ester mixtures wherein at least 80 mole % of the esters are alkyleneterephthalates or low molecular weight polymers thereof. The preferred polyesters may be prepared from reaction mixtures containing at least 80 mole % of terephthalic acid as the aromatic dicarboxylic acid component and at least 80 mole % of ethylene glycol, propylene glycol, 1,4-butandiol or any mixture thereof as the alkylene glycol component.

In preparing the polyesters of the present invention, any of the following compounds may optionally be added to the reaction mixture: aromatic and aliphatic dicarboxylic acids such as phthalic acid, isophthalic acid, adipic acid, sebacic acid, paraoxybenzoic acid, 1,4-cyclohexane dicarboxylic acid, oxypivalic acid, and alkylesters of these compounds; copolymerizable monomers such as propylene glycol, tetramethylene glycol, cross-linking agents such as trimethylol propane, pentaerythritol, glycerine, and methyl trimesate; additive polymers such as monomethoxy polyethylene glycol and styrenemethyl methacrylate copolymers; and other known functional derivatives capable of esterification with a dicarboxylic acid and glycol.

In the polycondensation process, a delustering agent such as titanium oxide, a stabilizer such as a phosphorous-containing compound and other modifiers may be added to the reaction mixture.

This invention will be illustrated in more detail by means of the following examples. The term "parts" used in Examples represents parts by weight, unless otherwise specified. The intrinsic viscosities for the polymers were measured at 30°C, using a mixed solvent of phenol and tetrachloroethane in a ratio of 3/2. The extinction coefficients were determined using a Beckman photocell and spectral photometer (wave length 350 m$\mu$ glass cell 4 cm). b values and L values indicating color tones of the polymer were determined by use of a tintometer (type CH-1 produced by Toyo Rika Co., Ltd.).

EXAMPLE 1

0.01 mole of potassium titanium tartrate and 0.01 mole of potassium titanium oxalate were each separately dissolved in 1000 cc of water to compare the stability of the compounds.

A comparison of the corrosiveness of the two solutions was made by introducing stainless steel pieces of SUS 27* and SUS 33** (produced by Nippon Yakin Co., Ltd.) into each solution. The stainless steel pieces had been surface-finished, washed in an organic solvent and dried beforehand. The results of the comparative tests are given in Table 1.

TABLE 1

| Sample | Test Piece | Extinction Coefficient | |
|---|---|---|---|
| | | Before exposure to sun-light | Three days after sun-light |
| Potassium titanium oxalate aqueous solution | Nil | 0.004 | 0.040 |
| " | SUS 27 | " | 0.090 |
| " | SUS 33 | " | 0.097 |
| Potassium titanium tartrate aqueous solution | Nil | 0.006 | 0.010 |
| " | SUS 27 | " | 0.007 |
| " | SUS 33 | " | 0.007 |

The U.S. standards corresponding to the Japanese Industrials Standards (JIS) are as follows:

| JIS | U.S. Std. |
|---|---|
| *SUS 27 | AISI 304 |
| **SUS 33 | SISI 316L |

From the above results (Table 1), it is apparent that the potassium titanium oxalate aqueous solution became heavily colored; particularly, the solution containing the stainless steel pieces showed intensive coloration after exposure to sunlight for 3 days. The potassium titanium tartrate did not show any coloration at all, proving that such solutions have excellent light stability.

EXAMPLE 2

0.1 mole of sodium titanium tartrate and of sodium titanium oxalate were each separately dissolved in 1,000 ml. of water contained glass vessels equipped with reflux condensers and then test pieces of stainless steel were introduced into the solutions. The solutions containing the test pieces were then boiled for 10 hours. After cooling, 10–20 ml of each solution were collected and a sulfuric acid-nitric acid-hydrogen peroxide solution was added to each sample to cause decomposition. After allowing the samples to cool, the mixtures were diluted with water. The samples were then colored by the addition of potassium thiocyanate. The extinction coefficients were then measured at 460 m$\mu$ to determine the iron content of each sample.

Table 2 gives the results of Example 2:

TABLE 2

| Sample | Test Piece | Iron (ppm)* |
|---|---|---|
| Sodium titanium oxalate | Nil | 0.2 |
| do. | SUS 27 | 35.5 |
| do. | SUS 27 plated with nickel | 7.4 |
| do. | SUS 33 | 6.2 |
| Sodium titanium tartrate | Nil | 0.5 |
| do. | SUS 27 | 1.3 |
| do. | SUS 27 plated with nickel | 0.8 |
| do. | SUS 33 | 1.0 |

* Weight (g) of Iron contained in $10^6$g of solution.

From the above results, it is evident that the sodium titanium oxalate aqueous solution was more corrosive than the sodium titanium tartrate solution.

EXAMPLE 3

Nine parts of dimethylterephthalate, 1 part of dimethyl isophthalate, 10 parts of ethylene glycol, and 0.003 parts of manganese acetate were introduced into a glass reactor equipped with a distillation device. The methanol formed during the course of the reaction was distilled off with heating at 200°C in a nitrogen gas atomsphere. After removal of the theoretical yield of methanol for the ester radical interchange reaction, an amount of ethylene glycol was also distilled off from the mixture by gradually reducing the pressure in the reactor. 0.04 parts of ammonium titanium tartrate was then added to the remaining solution mixture. The mixture was subjected to polycondensation for 4 hours at 275°C under a vacuum of 0.1 mm Hg to give a copolymerized polyester having an intrinsic viscosity of 0.978. In a comparative example wherein antimony trioxide was used in lieu of ammonium titanium tartrate, a copolymerized polyester having an intrinsic viscosity of only 0.741 was obtained after 6 hours of polycondensation.

EXAMPLE 4

Two hundred sixty-seven Parts of bis-($\beta$-hydroxyethyl) terephthalate and 75 parts of terephthalic acid were placed in a 1.5 l stainless steel autoclave in which air was preliminarily purged with nitrogen gas. The mixture was reacted at 260°C with stirring at a speed of 40 r.p.m., followed by reaction for 30 min. under a vacuum of 10 mm Hg to yield an initial polymer. Subsequently, 5 g. of the initial polymer were placed with porous glass boiling stones into a glass polymerization tube having a side tube. A predetermined amount of catalyst was added for polycondensation of the initial polymer at 275°C. The results are given in Table 3.

Table 3

| Kind of catalyst | Catalyst concentration (mole %)* | Polymerization time (Hour) | Instrinsic viscosity of polyester |
|---|---|---|---|
| Antimony oxide | 0.020 | 0.5 | 0.261 |
| do. | do. | 1.0 | 0.321 |
| do. | do. | 2.0 | 0.428 |
| Potassium titanium tartrate | 0.005 | 0.5 | 0.308 |
| do. | do. | 1.0 | 0.361 |
| do. | do. | 2.0 | 0.499 |
| do. | 0.020 | 0.5 | 0.513 |
| do. | do. | 1.0 | 0.693 |
| do. | do. | 2.0 | 0.915 |
| Titanium tartrate (IV) | 0.003 | 2.0 | 0.450 |
| Strontium titanium tartrate | 0.005 | 0.5 | 0.290 |
| do. | do. | 1.0 | 0.341 |
| do. | do. | 2.0 | 0.486 |
| do. | 0.020 | 0.5 | 0.463 |
| do. | do. | 1.0 | 0.705 |
| do. | do. | 2.0 | 1.003 |

* mole % to terephthalic acid

EXAMPLE 5

Three hundred fifty Parts of terephthalic acid, 404 parts of acetone, 0.43 parts of triethylamine, and 171 parts of ethylene oxide were introduced into a 1.5 l. stainless steel autoclave from which air had been purged with nitrogen gas. The mixture temperature was raised to 130°C (at 9.1 kg.cm$^{-2}$ guage pressure) over a period of 30 min. with agitation at a speed of 50 r.p.m., and the reaction was conducted for 5 hours at 130°C with the result that the pressure dropped to 5.2 kg.cm$^{-2}$ guage.

The pressure within the autoclave was further reduced gradually while maintaining the temperature at 120°C, whereby the unreacted ethylene oxide and acetone were distilled off. The yield based on the terephthalic acid reactant, was 67.7%. 226 parts of the reaction product were then placed in a 1.5 l. stainless steel autoclave, which had been purged with nitrogen gas beforehand, and were reacted at 260°C with stirring at a speed of 40 r.p.m. The water and ethylene glycol formed by the reaction were removed by distillation. Thereafter, 0.005 parts of potassium titanium tartrate was added to the reaction system, and the pressure of the system was reduced to a vacuum level of 0.1 mm Hg over a period of 30 min. at 265°C. The mixture was then reacted at 275°C for 140 min. under 0.01 mm Hg. The polymer thus obtained had an intrinsic viscosity of 0.63, a b value of 7.9 and a L value of 69.2.

In a comparative experiment, when 0.0055 parts of potassium titanium oxalate was used in lieu of the potassium titanium tartrate in the above method, the polymer obtained has an intrinsic viscosity of 0.625, a b value of 8.5, a L value of 69.0, and contained 1.34 ppm iron.

EXAMPLE 6

One thousand parts of terephthalic acid, 740 parts of ethylene glycol and 0.033 parts of sodium titanium tartrate were introduced into a 4 liter stainless steel autoclave from which air has been purged with nitrogen beforehand. The mixture was reacted by heating to 230°C at 3 kg.cm$^{-2}$ for 110 minutes with agitation at a speed of 90 r.p.m., the water of reaction and excess ethylene glycol were removed from the reaction by distillation. 254 parts of the reaction product and 7 parts of an ethylene glycol solution containing 20% by weight titanium oxide were placed in an 0.5 liter stainless steel autoclave. The pressure of the reactant mixture was reduced to 0.1 mm Hg over a 30 min. period while maintained at 265°C with agitation at a speed of 45 r.p.m. The reaction was allowed to continue for 20 min. at 275°C under a vacuum of 0.1 mm Hg to yield a polymer. The polymer thus obtained had an intrinsic viscosity of 0.565, a b value of 5.2 and a L value of 86.0.

When 0.176 parts of antimony trioxide was employed in place of the sodium titanium tartrate used in the above example, polymerization at 120°C gave a polymer having an intrinsic viscosity of 0.564, a b value of 4.9 and L value of 84.1.

EXAMPLE 7

Example 5 was repeated except that 0.0048 parts of barium titanium tartrate was used in lieu of potassium titanium tartrate to give a polymer having an intrinsic viscosity of 0.621, a b value of 6.8, a L value of 69.8, and an iron content of 0.71 ppm.

EXAMPLE 8

4,200 Parts of dimethylterephthalate, 3,500 parts of ethylene glycol, 5.2 parts of zinc acetate and 0.82 parts of ammonium titanium tartrate were introduced into a 17 liter stainless steel autoclave equipped with a distillation device. The mixture was heated at 250°C for 60 min. with agitation at a speed of 100 r.p.m. in a nitrogen gas atmosphere. The methanol produced was removed from the reaction mixture. The resultant solution was combined with 934 parts of an ethylene glycol solution containing 35% by weight of titanium oxide. The mixture was agitated and transferred to a 50 liter stainless steel autoclave from which air had been displaced by a nitrogen purge. 11,000 parts of polytetramethylene glycol having a molecular weight of 2,000 was then added.

The resultant solution was allowed to react while being agitated at a speed of 65 r.p.m. The pressure was reduced from atmospheric to 0.2 mm Hg and the temperature was raised from 230°C to 245°C over a period of 30 min. Thereafter, the reaction system was maintained at 245°C under a vacuum of 0.1 mm Hg for 150 min. The product was a copolymerized polyester having an intrinsic viscosity of 2.701, a $b$ value of 1.3 and excellent elasticity.

EXAMPLE 9

3060 Parts of dimethylterephthalate, 1960 parts of ethylene glycol, 1,410 parts of neopentyl glycol, 1.595 parts of zinc acetate and 0.319 part of sodium titanium tartrate were placed in a nitrogen-purged 50 liter stainless steel autoclave equipped with a distillation device. The contents were heated for 72 min. from 150°C to 220°C while being agitated at a speed of 130 r.p.m. The methanol produced by the reaction was removed from the system by distillation. After removal of an amount of distillate corresponding to the theoretical amount of methanol, 1,370 parts of sebacic acid were added to the resultant solution, and the mixture was heated for 40 min. from 220°C to 250°C, and then maintained at 250°C for 20 min. The water of reaction and excess ethylene glycol and neopentyl glycol were removed from the solution by distillation. The remaining solution was transferred to another nitrogen-purged 25 liter stainless steel autoclave. The reaction solution was then agitated at a speed of 48 r.p.m., the pressure was reduced from atmospheric to 3 mm Hg and the temperature was raised from 250°C to 270°C over a period of 75 min. The system was then maintained at 270°C for 36 min. in a vacuum of 0.3 mm Hg. The product was a pale yellow, transparent, copolymerized polyester resin having an intrinsic viscosity of 0.700 and strong adhesiveness.

EXAMPLE 10

10 Parts of terephthalic acid, 22 parts of ethylene glycol and 0.03 part of calcium titanium tartrate were placed in a reactor equipped with a distillation device. Esterification was effected by heating the mixture at 197°C for 3 hours until the theoretical amount of water of reaction had been removed by distillation. 0.005 part of antimony oxide was then added to the solution. The solution was heated to 275°C and excess ethylene glycol was distilled off from the solution by gradually reducing the pressure of the container. Polycondensation was then effected by maintaining the solution for 2 hours at 275°C under a vacuum of 0.01 mm Hg. The resultant polyester had a melting point of 263°C and an intrinsic viscosity of 0.780.

In a comparative example, 10 parts of terephthalic acid and 22 parts of ethylene glycol, without the addition of a catalyst (no calcium titanium tartrate), were esterified at 197°C, using the same method. This comparative run required 9 hours to distill off the theoretical amount of water.

EXAMPLE 11

10 Parts of terephthalic acid and 22 parts of ethylene glycol were esterified in the presence of 0.006 parts of strontium titanium tartrate in a manner similar to Example 10. After about 5 hours, a theoretical amount of water had been distilled off. Then, after addition of 0.005 parts of antimony oxide to the solution, polycondensation was effected at 275°C under a vacuum of 0.1 mm Hg for 3 hours. The polyester product possessed an intrinsic viscosity of 0.630.

EXAMPLE 12

9 Parts of terephthalic acid, 1 part of isophthalic acid and 22 parts of ethylene glycol were esterified in the presence of 0.03 parts of strontium titanium tartrate as in Example 10, and a theoretical amount of water was distilled off after about 3 hours. 0.005 part of antimony oxide was then added to the solution, and the mixture polycondensed at 255°C for 3 hours under a vacuum of 0.01 mm Hg. The product was a copolymerized polyester having a melting point of 237°C and an intrinsic viscosity of 0.653.

EXAMPLE 13

10 Parts of terephthalic acid and 22 parts of ethylene glycol were esterified in the presence of 0.02 parts of zinc titanium tartrate for 4 hours in a manner similar to Example 10 and were then polycondensed at 275°C for 3 hours under a vacuum of 0.01 mm Hg. The product was a polyester having a melting point of 263°C and an intrinsic viscosity of 0.785.

EXAMPLE 14

10 parts of terephthalic acid and 22 parts of ethylene glycol were esterified in the presence of 0.005 parts of lead titanium tartrate for 5 hours in a manner similar to Example 10. The excess ethylene glycol was removed from the solution by raising the temperature to 230°C and by gradually reducing the pressure of the container. In the same manner, 2.5 parts of terephthalic acid and 9 parts of neopentyl glycol were esterified in the presence of 0.002 parts of barium titanium tartrate. The two ester products were then combined in a single container. After addition thereto of 0.005 parts of antiminy oxide, the container contents were polycondensed at 275°C for 2.5 hours under a vacuum of 0.01 mm Hg to give a copolymerized polyester having a melting point of 200°C and an intrinsic viscosity of 0.750.

EXAMPLE 15

9 Parts of terephthalic acid, 1 part of p-hydroxyethoxy benzoic acid, and 20 parts of ethylene glycol were esterified in the presence of 0.02 parts of zinc titanium tartrate for 4 hours in a manner similar to Example 10. Subsequently, 0.003 part of antimony oxide was added thereto. The resulting mixture was polycondensed at 275°C for 3 hours under a vacuum of 0.01 mm Hg. The polyester product had a melting point of 239°C and an intrinsic viscosity of 0.621.

EXAMPLE 16

10 Parts of terephthalic acid, 22 parts of ethylene glycol, and 0.01 part of cobalt titanium tartrate were reacted in a manner similar to Example 10. After about 5 hours, a theoretical amount of water had been distilled off. 0.005 parts of antimony oxide was then added to the solution and the mixture was maintained at 275°C for 3 hours under a vacuum of 0.01 mm Hg. The product was a polyester having a melting point of 264°C and an intrinsic viscosity of 0.674.

EXAMPLE 17

50 Parts of terephthalic acid, 110 parts of ethylene glycol, and 0.05 parts of titanium tartrate were placed in a reactor equipped with an agitator, a thermometer, an inlet tube for a nitrogen gas purge, and a product distillation device. The contents were reacted at 197°C while passing a nitrogen gas purge through the reactor. After 2.5 hours, the theoretical amount of the water had been removed from the system. 0.02 parts of antimony oxide was then added to the solution, and the excess ethylene glycol was removed from the solution by raising the temperature to 230°C and gradually reducing the pressure of the container. This resulted in a partially condensed material which was then polycondensed at 275°C for 2 hours under a vacuum of 0.1 mm Hg. The polyester product was a white solid having a melting point of 262°C and an intrinsic viscosity of 0.592.

EXAMPLE 18

A stainless steel autoclave equipped with an agitator and a distillation tube for controlling pressure was charged with 166 parts of terephthalic acid, 124 parts of ethylene glycol, and 0.052 part of ammonium titanium tartrate. The pressure within the autoclave was reduced to 2.5 kg.cm$^{-2}$ gauge and purged with nitrogen gas. The mixture was esterified at 235°C while the water produced was separated from the system. It required 90 min. to distill off the theoretical amount of the water of reaction. The pressure within the autoclave was then released and the contents were transferred to a stainless steel autoclave for polycondensation. The polycondensation reaction was conducted for 10 min. at 260°C under atmospheric pressure, then for 20 additional min. at 270°C under a vacuum of 10 mm Hg, and, finally, for 3 hours under a vacuum of 0.05 mm Hg. The polyester thus obtained was pale yellow and had a melting point of 260°C, an intrinsic viscosity of 1.061 and an iron content of 0.9 ppm.

In a comparative example, the esterification was conducted using the same reactants except that no ammonium titanium tartrate catalyst was employed. It required 150 min. to distill off 35 parts of water, which amount corresponded to the theoretical amount.

The above reaction was repeated by using ammonium titanium oxalate in lieu of ammonium titanium tartrate. The result was a yellow-colored polyester which had a melting point of 258°C, an intrinsic viscosity of 0.985, and an iron content of 2.5 ppm.

EXAMPLE 19

97 parts of dimethyl terephthalate, 90 parts of 1,4-butandiol and 0.055 parts of potassium titanium tartrate were placed in a glass reaction container equipped with an agitator, a thermometer, an inlet for nitrogen gas and a product distillation device. The contents were reacted at 220°C for 120 min. with a nitrogen gas purge to remove distilled methanol from the reaction system.

10 parts of the reaction product thus obtained were placed together with a porous glass boiling stone in a glass polymerization reactor with a side tube and were reacted at 260°C for 2 hours under a vacuum of 0.3 mm Hg to give a polytetramethylene terephthalate which had an intrinsic viscosity of 0.652. The product had excellent tone and moldability.

For comparison, the above method was repeated in the same manner except that 0.036 parts of zinc acetate were used in lieu of potassium titanium tartrate, with the result that only 50% of the theoretical amount of methanol was distilled off and the polymerization reaction did not proceed at all.

The invention may be embodied in other specific forms without departing from the spirit or essential characteristics thereof. The foregoing examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In the polycondensation of an alkylene glycol-aromatic dicarboxylic acid ester reaction mixture, the improvement which comprises adding a catalytic amount of a titanium tartrate compound to the reaction mixture and polycondensing said ester in the presence of said titanium tartrate compound.

2. The method of claim 1 wherein at least 80 mole % of the ester in the reaction mixture is an alkyleneterephthalate or polymer thereof.

3. The method of claim 1 wherein said titanium tartrate compound is selected from titanium tartrate (III), titanium tartrate (IV), ammonium titanium tartrate, sodium titanium tartrate and potassium titanium tartrate.

4. The method of claim 1 wherein the alkylene glycol is selected from ethylene glycol, propylene glycol, 1,4-butandiol and mixtures thereof.

5. The method of claim 1 wherein said catalytic amount is from about 0.0001% to about 5% by weight of said polyester product.

6. A method for producing polyethylene terephthalate comprising:
    forming a solution containing an ester of terephthalic acid and an alkylene glycol;
    adding a catalytic amount of a titanium tartrate compound to said solution; and
    polycondensing said ester to form polyethylene terephthalate.

7. The method of claim 6 wherein said catalytic amount is between about 0.0001 and 5% by weight of the polyester product.

8. The method of claim 6 wherein said alkylene glycol is selected from ethylene glycol, propylene glycol, 1,4-butandiol and mixtures thereof.

9. The method of claim 6 wherein said alkylene glycol is ethylene glycol.

* * * * *